Jan. 27, 1959 V. K. PELTOLA 2,871,449
MAGNETIC RESTORING FORCE SUSPENSION GALVANOMETER
Filed June 8, 1953 2 Sheets-Sheet 1

INVENTOR.
Veikko K. Peltola
BY Robert H. Wendt
Att'y

Jan. 27, 1959 V. K. PELTOLA 2,871,449
MAGNETIC RESTORING FORCE SUSPENSION GALVANOMETER
Filed June 8, 1953 2 Sheets-Sheet 2

INVENTOR.
Veikko K. Peltola
BY Robert H. Wendt
Att'y

United States Patent Office 2,871,449
Patented Jan. 27, 1959

2,871,449

MAGNETIC RESTORING FORCE SUSPENSION GALVANOMETER

Veikko K. Peltola, Chicago, Ill., assignor to Illinois Testing Laboratories, Inc., Chicago, Ill., a corporation of Illinois Application June 8, 1953, Serial No. 360,052

1 Claim. (Cl. 324—154)

The present invention relates to a magnetic restoring force suspension galvanometer, and is particularly concerned with electrical instruments of the suspended filament type, in which magnetic forces are employed for producing and regulating the amount of restoring torque for the moving element.

One of the objects of the invention is the provision of an improved electrical instrument of the class described which has such high sensitivity that it can be used for measuring relatively faint signals without necessity for amplification.

Another object of the invention is the provision of an improved type of suspension galvanometer, in which the amount of restoring torque may be regulated by the use of a magnetic tension bearing system at the other end of the moving element.

Another object of the invention is the provision of an improved electrical instrument of the bifilar suspension type, in which the restoring torsion may be adjusted by adjusting the effective tension of a magnetic bearing system located at the other end of the moving element of the instrument.

Another object of the invention is the provision of an improved instrument of the filament suspension type, in which the sensitivity of the instrument may be adjusted by adjusting the amount of restoring torque, which in turn is effected by reducing the tension in the suspension system.

Another object of the invention is the provision of an improved type of galvanometer, in which no springs are required and no pivots are required.

Another object is the provision of an improved electrical instrument in which the movement does not rely upon torsion forces within the suspension filaments so that the filaments can be made rugged and durable.

A further object is the provision of an improved instrument of the class described, in which the restoring forces can be caused to become smaller per degree of coil deflection as the coil deflection becomes greater, thus providing a nonlinear scale which has larger scale divisions at the upper end of the scale.

Another object of the invention is the provision of an improved instrument of the class described, in which the restoring force may be so regulated that a linear scale distribution may be employed.

Another object of the invention is the provision of an improved instrument of the class described, in which the restoring force can be so regulated that it becomes larger per degree of coil deflection as the coil deflection becomes greater, so that a nonlinear scale may be provided in which the coil divisions may be larger at the lower end of the scale, thus providing a greater accuracy of reading of the scale at that range of the scale.

Another object of the invention is the provision of an improved instrument of the class described, in which an electromagnet may be employed for producing the field for a variable restoring force, the amount of which can be controlled as a function of some parameter for which it is desired to change the movement sensitivity.

Another object of the invention is the provision of an improved electrical instrument which is durable, which may be mounted vertically, horizontally, or in any other desired position, which is not damaged by shocks, which may be manufactured economically, which is adapted to retain its calibration, and which may be used for a long period of time without necessity for replacement or repair of any of its parts.

Other objects and advantages of the invention will be apparent from the following description and the accompanying drawings, in which similar characters of reference indicate similar parts throughout the several views.

Referring to the two sheets of drawings accompanying this specification,

Figure 1:
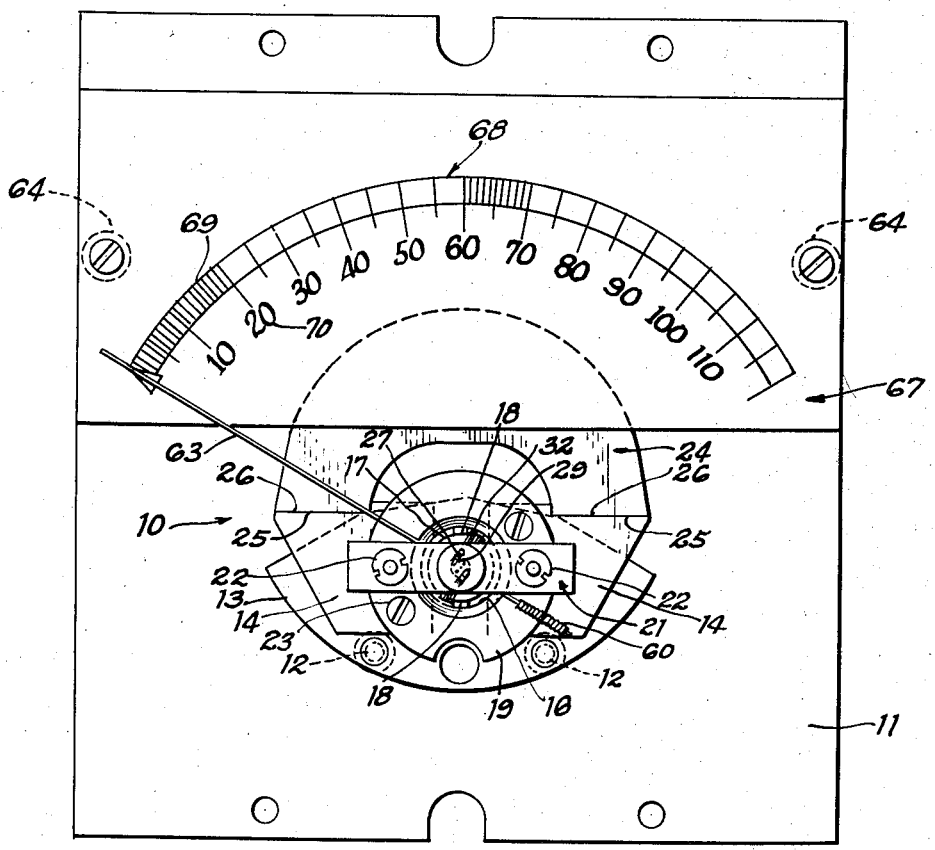
Fig. 1 is a top plan view of an electrical instrument embodying the inventon.
Figure 2:
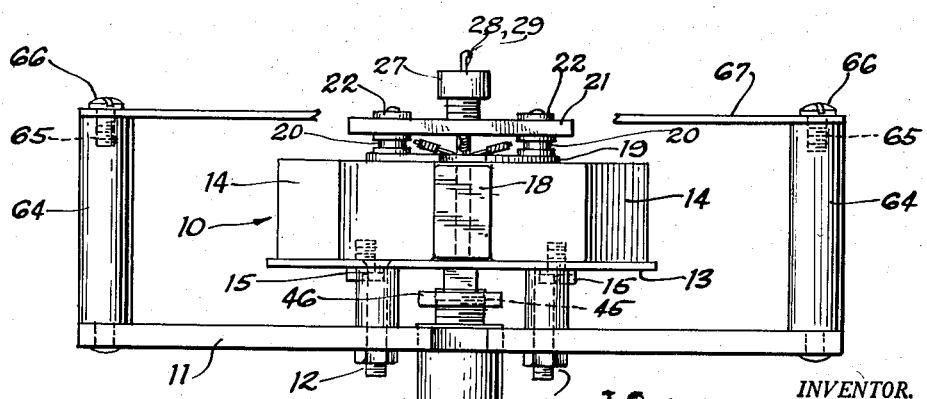
Fig. 2 is a front elevational view of the instrument of Fig. 1.

Referring to Figs. 1 and 2, 10 indicates in its entirety an electrical instrument embodying the invention, which is mounted upon a suitable support, such as an insulating plate or panel 11. The movement may be supported upon the plate 11 by means of a pair of screw bolts and nuts 12, the bolts being carried by a metal plate 13 of nonmagnetic material, which is secured to a pair of soft iron pole pieces 14 by means of screw bolts 15.

The pole pieces 14 are formed with inner partially cylindrical surfaces 16 on opposite sides of a cylindrical core 17 of paramagnetic material, which is supported between the pole pieces by means of lugs 18, extending outwardly from the core 17 and secured between the pole pieces 14 at opposite sides of the core.

A ring 19 of nonmagnetic metal carries a pair of upwardly extending posts 20 for supporting a nonmagnetic bridge 21, which is secured on the reduced threaded ends of posts 20 by nuts 22. Ring 19 is secured to the pole pieces 14 by screw bolts 23 passing through the ring and threaded into the pole pieces.

A permanent magnet 24 of U shape has its poles 25 secured in engagement with the adjacent plane surfaces 26 of the pole pieces; and the magnet 24 supplies the magneto-motive force for the instrument.

The bridge 21 supports a substantially cylindrical threaded insulating plug 27, which is threaded into the bridge for axial adjustment and carries a pair of terminals 28 and 29 extending into apertures in the plug and electrically connected to a pair of fine wire suspension members 30 and 31, respectively, which depend from the plug 27.

The type of instrument which has been selected to illustrate the invention is of the moving coil type; and the moving coil 32 has the terminals of its coils connected at 33 and 34 electrically to the filaments 30, 31 so that the filaments may be employed for conducting current to the moving coil.

Any type of moving coil may be employed, such as, for example, a rectangular spool 35, having the coils 32 wrapped around it, and having an axial post 36 at its upper end carried by an attaching plate 37, which may be cemented or otherwise secured axially to the upper end of the coil 32.

The post 36 may have non-magnetic metal pins 33 and 34, both at the same radial distance from the axis of the coil, to which the suspension filaments 30 and 31 and the connections from the moving coil 32 may be secured. The moving coil 32 surrounds the core 17 in the air gap between the core 17 and the pole pieces 14; and the coil is spaced from the core and the pole pieces in the air gap.

In some embodiments of the invention a single filament may be employed, this changing the characteristics of the instrument because of the magnitude of the restoring torsional force of such a single filament.

At its lower end the coil 32 supports a similar axial post 39 carried by a similar plate, which is secured by cement or otherwise to the lower end of the coil. The post 39 carries an extension shaft 40, which may be made of non-magnetic material, such as brass tubing; and both of the posts 38 and 39 are made of non-magnetic material.

At its lower end the extension 40 carries a magnetic bearing member, which may comprise a body of soft iron alloy 41.

This body is preferably conical at its lower end 42, terminating in a point 43 located in the axis of the moving coil; and the body 41 has a cylindrical portion 44 used for its support on the extension 40, which extends into a bore, where it is threaded or frictionally secured.

Figure 3:
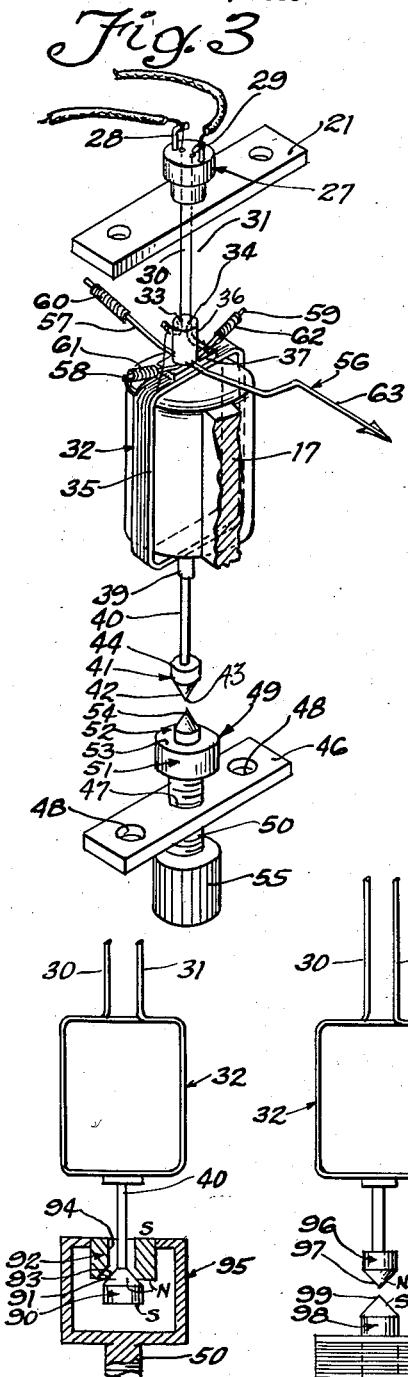
Fig. 3 is a diagrammatic view in perspective of the moving coil element and its supports.

The supporting lugs 18 for the core are extended downwardly and provided with inwardly turned attaching flanges 45, which may carry a lower bridge member 46. The lower bridge member (Fig. 3) has a threaded bore 47 located axially in the bridge; and the bridge is secured to the attaching flanges 45 by screw bolts through the apertures 48. Another magnetic bearing member 49 is carried by a threaded shank 50 located in the bore 47; and this magnetic bearing member 49 may comprise a cylindrical magnet 51, having a conical member or pole piece 52 axially secured to its upper plane surface 53.

The conical pole piece has its point 54 located in the axis of the moving coil; and its position may be adjusted by rotating the knurled head 45 carried by threaded shank 50, which is adapted to move the magnet 51 and pole piece 52 upward or downward.

The moving coil 32 supports a pointer assembly 56, which includes a central supporting plate with three radially extending balance arms 57, 58, 59. Each balance arm carries a spiral spring 60, 61, 62, serving as a counterbalance weight of small mass for counter-balancing the pointer, 63, and achieving a dynamic balance of the moving coil system.

The panel 11 may support a pair of studs 64, having threaded bores 65 at their upper ends for receiving screw bolts 66 used to secure a dial plate 67 to the studs 64. The dial plate 67 is preferably provided with a scale 68, having scale divisions 69 and numerical indicia 70.

The numerical indicia and the spacing of the scale divisions depend upon the characteristics of the instrument; and the scale may be linear or nonlinear; and the characteristics may be so adjusted that certain parts of the scale and the scale divisions may be more widely spaced at the point where most of the readings are to be expected.

The zero adjustment of the movement is accomplished by rotating the insulating plug 27, which may be made of a suitable plastic, such as that sold on the market under the name "nylon."

The operation of the instrument is as follows: At the magnetic bearing elements 41 and 52 the magnet 51 magnetizes the soft iron cone 52, which acts as a pole piece; and either end of the magnet 51 may comprise a north or a south pole.

The cone 41 acts as an armature, which in turn is magnetized by the flux coming from the cone 52. The flux from the magnet 51 tends to become concentrated in the two cones 52 and 42 because they provide the easiest path for magnetic flux, or the path of the least reluctance.

The points 43 and 54 of the members 41 and 52 are the closest parts of these magnetic members; and they are therefore drawn into axial alignment with each other by the magnetic flux and resulting mechanical forces, the flux acting like a rubber band in tension from one point to the other.

Thus the magnetic bearing member 41 is always maintained in centered position; and the weight of the parts is so small in comparison to the strength of the magnet 51 that the instrument may be mounted vertically or horizontally or in any other position.

The magnet 51 is preferably made of high coercive force material, such as an alloy sold on the market under the name "Alnico."

The moving coil and its suspension filaments 30, 31 are thus subjected to axial tension. When a current is introduced into the moving coil 32, the interaction between the flux caused by this current and the flux which extends from one pole piece 14 to the other pole piece through the core 17 causes a rotative force on the moving coil 32, moving the pointer 63 along the scale 68; and the position of the pointer is a measure of the amount of the current passing through the moving coil 32.

As the moving coil 32 rotates the suspension filaments 30, 31 move from a straight position to a diagonal position in which they are effectively shortened, which is permitted by the magnetic bearing members 41, 52 that maintain a tension on the filaments.

The magnetic force, maintaining tension on the filaments, tends to lengthen the filaments, which gives the filaments a rotative restoring force that is operative until the filaments again reach a straight condition at zero position. Thus the lower magnetic bearing members act with the suspension filaments to provide a restoring force for the moving coil, which requires no springs nor any pivots, thus eliminating friction and making the moving coil movement more sensitive to variations in current.

It is found that when the magnet 51 and its pole piece 52 are withdrawn away from the cone armature 41, the sensitivity of the instrument is increased because the amount of magnetic force is reduced due to leakage of flux; and the sensitivity may be made such that very faint signals can be measured without amplification of the signals.

Figure 4:
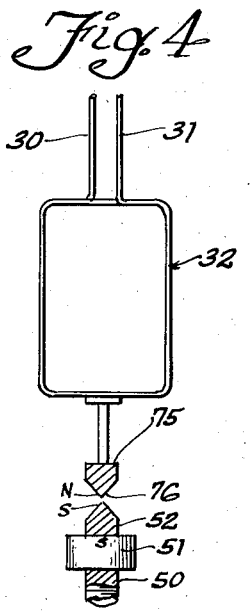
Fig. 4 is a fragmentary diagrammatic view of an alternative mode of support of the moving element.

Referring to Fig. 4, this is a modification showing a suspension in which the upper paramagnetic member comprises an Alnico magnet 75, the conical point 76 of which may be a north pole. The lower paramagnetic member may comprise a cylindrical Alnico magnet 51 provided with a conical soft iron pole piece 52, the point of which is the south pole of this assembly.

All of the paramagnetic members of Figs. 4–9 are supported upon threaded shanks 50 for axial adjustment; and all of the filaments 30, 31 are supported from the upper bridge 21 by means of an insulating plug 49.

In the assembly of Fig. 4 the pole piece 52 is, of course, magnetized and has a south pole at its point 54 so that these unlike magnetic poles attract each other.

Figure 5:
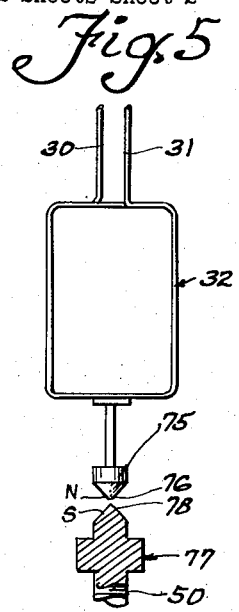
Fig. 5 is a similar view of another type of support for the moving element.

Referring to Fig. 5, in this embodiment the upper paramagnetic member 75 is again an Alnico magnet, having a conical point 76. The lower paramagnetic member 77 may comprise a body of soft iron of any suitable shape, having a conical point 78. In this case the body 77 is, of course, magnetized by flux from the Alnico magnet 75, to which it is attracted because the magnet 75 has its north pole downward; and it induces an opposite or south pole at the point 78.

Figure 6:
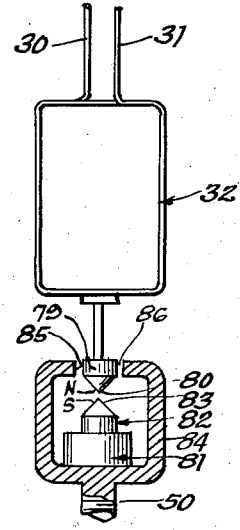
Fig. 6 is a similar view of another type of support for the moving element.

In the modification of Fig. 6 the upper paramagnetic member 79 may be of soft iron, having a conical point 80. The lower assembly includes a cylindrical Alnico magnet 81 and a soft iron pole piece 82, having a conical point 83. The lower magnetic member 81 may be enclosed in a cylindrical housing 84 of soft iron, which provides an easy magnetic path for the flux issuing from the lower end of magnet 81.

The cylindrical housing 84 has its upper end provided with a cylindrical aperture 85 surrounding the round body 79 of soft iron, and providing an annular air gap 86. This form of magnetic assembly is more efficient, causing less leakage of flux because of the housing 84, which carries the flux from the end of one magnet to the end of the other.

Figure 7:
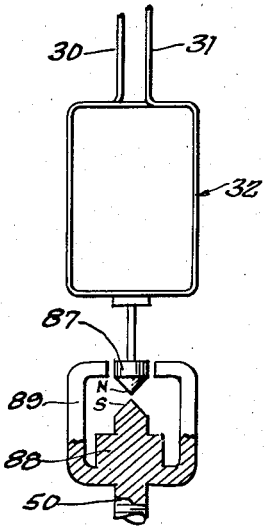
Fig. 7 is a similar view of another modified form of support for the moving element.

Referring to Fig. 7, this structure is the same as Fig. 6 except that the upper member 87 is an Alnico magnet; and the lower member 88 and housing 89 are all of soft iron, but are magnetized by the magnet 87.

Figures 8, 9:
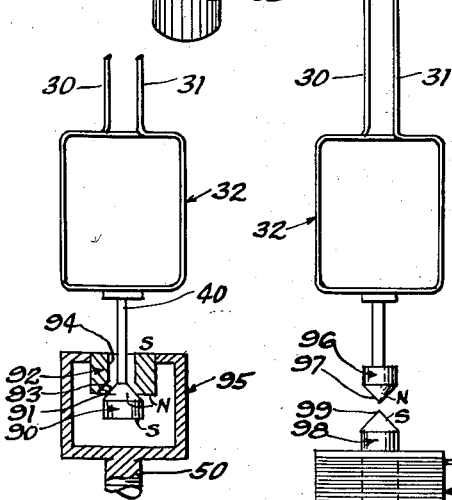
Fig. 8 is a similar view of a further type of support for the moving element.
Fig. 9 is a similar view of another type of support for the moving element, employing an electromagnet.

Referring to Fig. 8, this is a modification in which the tension in the filaments 30, 31 is caused by magnetic repulsion. The paramagnetic member 90 on the shaft 40 is a magnet of Alnico, having an upper conical formation 91 and polarized with its upper end a north pole and its lower end a south pole. This is repelled by an upper magnet 92 of Alnico, which is cylindrical, and has an inner frusto-conical surface 93 and a cylindrical bore 94 passing the shaft 40.

A soft iron shield 95 of cylindrical shape surrounds the assembly and carries the upper magnet 92. The shield 95 is in turn supported by the same threaded shank 50; but in this case its repulsion, which causes tension, is diminished by screwing the assembly 95 upward, and increased by screwing the assembly 95 downward.

The upper member 92 has an Alnico magnet, having a lower north pole. As two north poles 90 and 92 face each other, they repel each other, causing a tension in the filaments 30, 31.

Referring to Fig. 9, this is a modification in which the upper paramagnetic member 96 may be a body of soft iron, having a conical point 97; and the lower paramagnetic member 98 may be a cylindrical core of an electromagnet, having a conical point 99. The core 98 carries energizing coils 100. The terminals 101 and 102 may regulate the sensitivity of the instrument responsive to the amount of current passing in the coils 100.

In all of these embodiments the operation is substantially the same in that the coaction of the flux and the two paramagnetic members, which form a magnetic bearing, also causes a tension of the filaments and gives the filaments the power to exert a restoring force.

It will thus be observed that I have invented an improved electrical instrument movement of the type having a filament suspension, providing a restoring force by means of a magnetic bearing, which produces tension in the filaments.

The sensitivity of the instrument may be increased by moving the paramagnetic members, which constitute the magnetic bearing, farther apart to reduce the tension; and the instrument is so sensitive that it will measure faint signals, which previously have required amplification. No such springs or bearings are required; and the friction is reduced to a minimum, comprising only that internal friction which exists inside the filaments, and which is a minimum.

The present movement does not rely on torsion forces within the filaments; and thus the filaments can be made very rugged.

The restoring forces can be made to become smaller per degree of coil deflection as the coil deflection becomes greater, or conversely the restoring forces can be made to become larger per degree of coil deflection as the coil deflection becomes greater.

Thus the characteristics of the instrument may be adjusted as desired; and they may also be so adjusted that the scale distribution is linear.

When an electromagnet is employed to produce the field for the restoring force, the sensitivity of the instrument can be controlled as a function of a current signal applied to the electromagnet coils.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States, is:

An electrical instrument comprising a support, a magnetic field structure carried thereby, and comprising a permanent magnet having a pair of opposed pole pieces with concave partially cylindrical faces, a substantially cylindrical magnetic core carried by said support and concentrically located with respect to said pole faces, forming an air gap, an axially and radially rigid supporting means for two filaments, which carry the upper end of a moving coil unit, comprising a rigid bridge of non-magnetic metal carried by said magnetic field structure opposite each end of said core, each bridge having an axial, concentric, threaded bridge bore, a threaded insulating plug located in one of said bridge bores, and having two parallel bores located at equal radial distances from the axis of said plug, a pair of fine wire suspension filaments secured in said parallel bores at one end of the filaments, a moving coil unit comprising a rigid, rectangular spool having a coil about said spool, with its ends connected to said filaments, said spool having a rigid, axial, insulating post carried by one end of said spool, and having a pair of metal pins therein equally spaced from the axis of said post, and to which the ends of the suspension filaments are secured, a magnetic centering and tensioning suspension for the lower end of the moving coil unit, comprising a rigid shaft of non-magnetic metal axially located and extending from the other end of said spool, a first cylindrical body of paramagnetic metal carried by the end of said shaft and concentrically located thereon, and having a conical end portion, said first body being located adjacent to and concentric with a second paramagnetic body carried by the rigid bridge at the other end of the field structure, the said latter bodies being magnetized with such polarity that they exert an axial tension on the filaments through the shaft and moving coil unit, centering the shaft and causing the parallel filaments to seek a straight parallel zero position, from which the coil unit is moved rotatively by magnetic forces caused by current in the coil unit, causing the filaments to assume a partially helical position in which the tension in the filaments caused by the magnetic bodies produces an axial movement and a rotative torque acting on the coil unit, the filaments tensioned by the magnetic bodies constituting the sole restoring force tending to move the coil unit to zero position.

References Cited in the file of this patent

UNITED STATES PATENTS

| Number | Name | Date |
| --- | --- | --- |
| 727,606 | Fish | May 12, 1903 |
| 1,472,198 | Taylor | Oct. 30, 1923 |
| 2,315,408 | Faus | Mar. 30, 1943 |
| 2,562,183 | Greibach | July 31, 1951 |
| 2,658,805 | Mendelsohn | Nov. 10, 1953 |
| 2,713,523 | Medicus | July 19, 1955 |

FOREIGN PATENTS

| Number | Country | Date |
| --- | --- | --- |
| 68,119 | Austria | Mar. 10, 1915 |
| 647,847 | Great Britain | Dec. 20, 1950 |
| 680,679 | Great Britain | Oct. 8, 1952 |